United States Patent [19]

Verburg

[11] 4,452,499

[45] Jun. 5, 1984

[54] SERVICE STAND FOR WORK AREA

[75] Inventor: Goris Verburg, Maarn, Netherlands

[73] Assignee: Zumtobel GmbH & Co., Lindau, Fed. Rep. of Germany

[21] Appl. No.: 349,511

[22] Filed: Feb. 17, 1982

[30] Foreign Application Priority Data

Feb. 20, 1981 [DE] Fed. Rep. of Germany ....... 3106255

[51] Int. Cl.³ ........................ A47B 77/08; F16M 3/00
[52] U.S. Cl. ..................................... 312/223; 312/236;
312/237; 312/247; 312/250; 248/676; 52/221
[58] Field of Search ............... 312/236, 223, 245, 246,
312/247, 248, 250, 237, 137; 52/221, 288;
248/676

[56] References Cited

U.S. PATENT DOCUMENTS

| 2,120,571 | 6/1938 | Reichenstein et al. | 312/237 |
|---|---|---|---|
| 3,085,842 | 4/1963 | Johnson | 312/223 |
| 3,170,710 | 2/1965 | Rachman | 312/223 |
| 3,278,247 | 10/1966 | Tisdell | 312/248 |
| 3,304,609 | 2/1967 | Horowitz et al. | 312/250 |
| 3,514,794 | 6/1970 | Pofferi | 312/237 |
| 3,556,455 | 1/1971 | Storm | 312/247 |
| 3,562,114 | 2/1971 | Steidl et al. | 312/236 |
| 4,338,485 | 7/1982 | Fullenkamp et al. | 312/245 |
| 4,353,411 | 10/1982 | Harter et al. | 52/221 |
| 4,373,761 | 2/1983 | Hansberry, Jr. | 312/237 |

FOREIGN PATENT DOCUMENTS

| 1690160 | 5/1971 | Fed. Rep. of Germany . | |
|---|---|---|---|
| 2122928 | 11/1972 | Fed. Rep. of Germany . | |
| 2309935 | 2/1973 | Fed. Rep. of Germany . | |
| 2639356 | 3/1977 | Fed. Rep. of Germany | 312/247 |
| 1049811 | 11/1966 | United Kingdom | 312/247 |

Primary Examiner—Victor N. Sakran
Attorney, Agent, or Firm—Karl F. Ross; Herbert Dubno

[57] ABSTRACT

A service and supply stand is basically formed as an upright column having a front wall, a back wall, and a pair of opposite sides. A plurality of lines are provided in the column for conduction of fluids and electricity and a plurality of connection plates form a portion of the front wall and carry respective groups of connections connected to these lines. A horizontal support rail is carried on the column adjacent the connection plates and a device housing is secured to one of the sides and projects laterally from the column. Another horizontal support rail is also carried on the device housing. The column has a core formed with upright and longitudinal passages through which the various supply lines run. It is of rectangular section and it is possible for the back wall and sides of the column to be also adapted to carry such connection plates. Normally only the front and back wall are adapted to carry such connection plates and the sides only are adapted to carry the housing.

28 Claims, 16 Drawing Figures

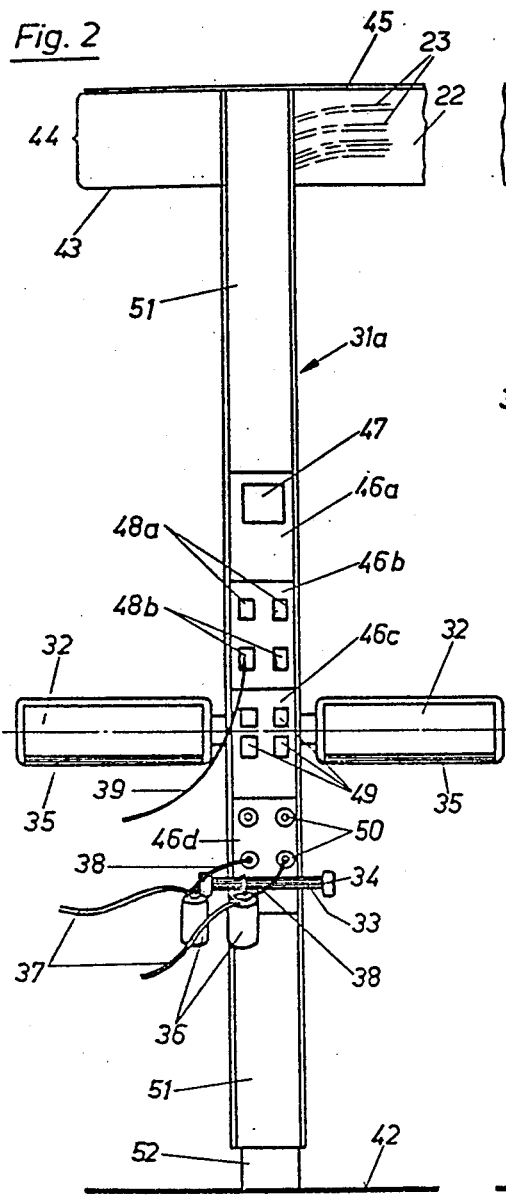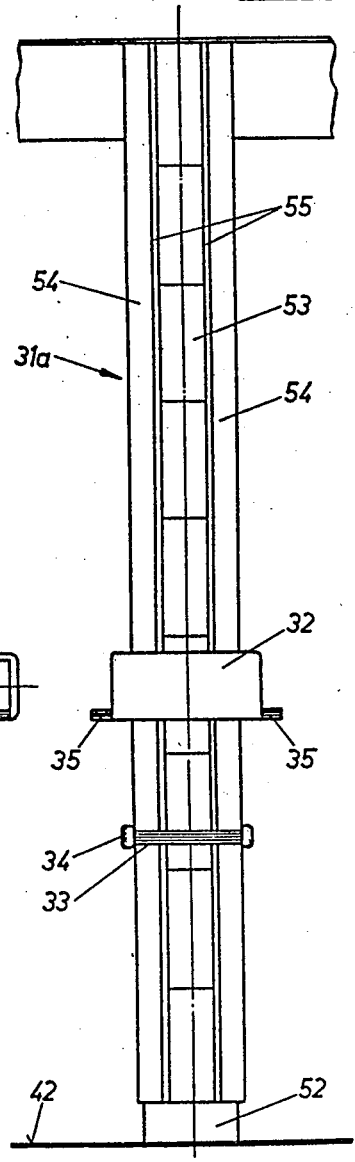

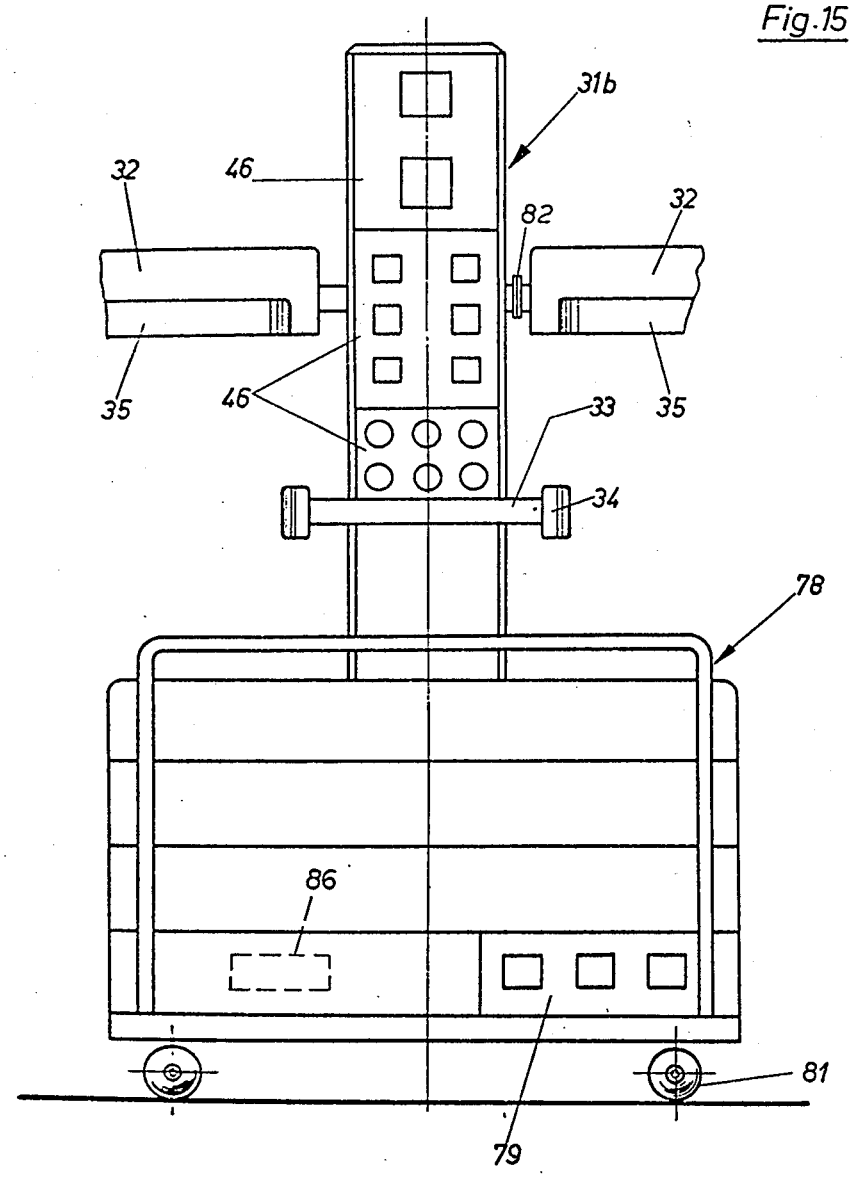

SERVICE STAND FOR WORK AREA

FIELD OF THE INVENTION

The present invention relates to a service station or stand for a work area. More particularly this invention concerns a stand for supplying electricity and various fluids to and making various other connections at a work area such as a intensive-care hospital bed.

BACKGROUND OF THE INVENTION

A work table in a laboratory, a hospital bed in an intensive-care unit, an operating table in an operating room, or the like is frequently provided with a so-called service stand which can supply various fluids and gases to the work area, and which can carry monitors of sensing devices that can take and display various readings. In a laboratory or similar work area the service stand can supply air under pressure, electricity, and water, as well as provide a suction line and connections to various devices connected to or carried directly in the stand. In a hospital situation such a service stand can supply various gases and liquids, as well as carry connections to the appropriate monitoring devices at least some of which—like a cardiac monitor—are carried directly in the service stand.

It has been suggested, in order to save space, to make such an arrangement as a column. This requires, however, a vertical arrangement of the various connections, so that all but the topmost connections can be covered by hoses or wires connected to the connections above. As a result it is necessary to provide considerable vertical space between the connections in order to give orderly access to them, which inherently limits the number of connections that can be provided.

Thus recourse has been had to service stands such as described in German patent document No. 1,690,160 which have longitudinally extending rails on which the connections are provided. In this manner the connections can be grouped relatively closely without interfering with one another. If such a horizontally extended arrangement is mounted on a wall, it requires that the work area also be against the wall, thereby limiting access to it. When, as has been suggested, it is suspended from the ceiling at, for instance, the head of a hospital bed, it does not prevent travel completely around the work area, but does still largely restrict access from the side it is provided at. Furthermore when such an arrangement is provided, as suggested in German patent documents Nos. 2,122,928 and 2,309,935, with support rails on which bottles, masks, and the like can be hung they even further block off one side of the work area.

OBJECTS OF THE INVENTION

It is therefore an object of the present invention to provide an improved service or supply stand for a work area.

Another object is the provision of such a service or supply stand for a work area which overcomes the above-given disadvantages.

A further object is to provide a service or supply stand which is relatively compact yet still convenient to use.

SUMMARY OF THE INVENTION

These objects are attained according to the instant invention in a service and supply stand basically formed as an upright column having a front wall, a back wall, and a pair of opposite sides. A plurality of lines are provided in the column for conduction on fluids and electricity and a plurality of connection supports form a portion of the front wall and carry respective groups of connections connected to these lines. A horizontal support rail is carried on the column adjacent the connection supports and a device housing is secured to one of the sides and projects laterally from the column. Another horizontal support rail is also carried on the device housing.

With the arrangement according to the instant invention it is possible to hook up a great many hoses, wires, and the like to the service and supply stand without them interfering with one another. It is possible to hang various accessories—drip bottles, wash bottles, oxygen masks, anesthetic masks and the like—from the support rails in a convenient but out-of-the-way manner. The column, when used at a hospital bed, is normally provided at one of the corners at the head end, so that the various lines merely extend over the corner of the bed to the patient, leaving access on virtually all sides of the bed to this patient. Even a relatively bulky item like a cardiac monitor can be carried in a convenient manner by the stand according to this invention.

According to this invention the suppports are plates flush with the front side. The column has a core formed with upright and longitudinal passages through which the various supply lines run. The column is of rectangular section and it is possible for the back wall and sides of the column to be also adapted to carry such connection plates. Normally only the front and back wall are adapted to carry such connection plates and the sides only are adapted to carry the housing. Such an arrangement is extremely rigid, yet allows the various equipment and connections to be provided at any desired location for maximum ease of use.

According to this invention the first-mentioned support rail is annular and surrounds the column. In addition it lies substantially on a horizontal plane. Thus it is possibly to hang equipment all around the column. Those articles hung on the rail at the sides of the column would not get in the way of anything.

A pivot can secure the housing to the side for pivoting about a horizontal axis. In this manner the housing can be directed for easiest reading of, for instance, a monitor carried on it. In addition the housing can be provided with a slide-out support plate, with a slide-out drawer, or can itself carry one such connection plate. Several such consoles or housings can be mounted on the column, depending on need.

The fluids transmitted through the connections according to this invention include liquids and gases. Gas connections for a hospital application could include oxygen, compressed air, nitrous oxide, an anesthetic gas, a vacuum line, and even flammable gases such as butane, methane, propane, or the like. Liquid connections could be for hot and cold water, wash and rinse solutions, saline, and coolants. In addition ventilation connections could be provided. The electrical connections could be as mundane as a standard outlet, and as sophisticated as inputs for complex medical equipment, as well as the standard intercom and call lines, and even television controls. In any case adjacent connections are for related functions. More particularly the connections of each connection plate serve related functions, although it is possible for the connections of one group serve unrelated functions.

In accordance with another feature of this invention a pivot carries the column for pivoting of same about a vertical axis. This pivot subdivides the column vertically into two relatively pivotal parts. Thus the business side of the column can be aimed where most appropriate for convenient use.

The column according to this invention can stand on the floor. It may have an upper end adapted to be secured to the ceiling above the column. Such an arrangement provides a great deal of space for the connections and will be extremely stable. It is also within the scope of this invention for the column to be adapted to be suspended from the ceiling. This arrangement is extremely practical in locations like hospitals where the floor must be kept as free as possible for hygienic purposes, and where typically there are lower ceilings above which all the various lines can be run.

The column can, according to another feature of this invention, be horizontally displaceable. To this end it can be carried on a wheeled cart that is provided with liquid and gas reservoirs connected to the lines, with electrical interconnections connected to the lines, and with an electrical feed connected to one of the lines. Such an arrangement is particularly useful when the service column is to be an emergency-resuscitation apparatus that is only used for a short time and that is taken to the emergency in the hospital. Such a mobile service and supply stand can be provided with a wireless—radio or ultrasound—transmitter having an input connected to at least one of the lines so that a remote monitor or the like can be used.

DESCRIPTION OF THE DRAWING

The above and other features and advantages will become more readily apparent from the following, reference being made to the accompanying drawing in which:

FIG. 2 is a front view of a second embodiment of the apparatus of this invention;

FIG. 3 is a side view of the apparatus of FIG. 2;

FIGS. 14 and 15 are front and side views of a seventh embodiment of the apparatus of the present invention.

SPECIFIC DESCRIPTION

Figure 1:
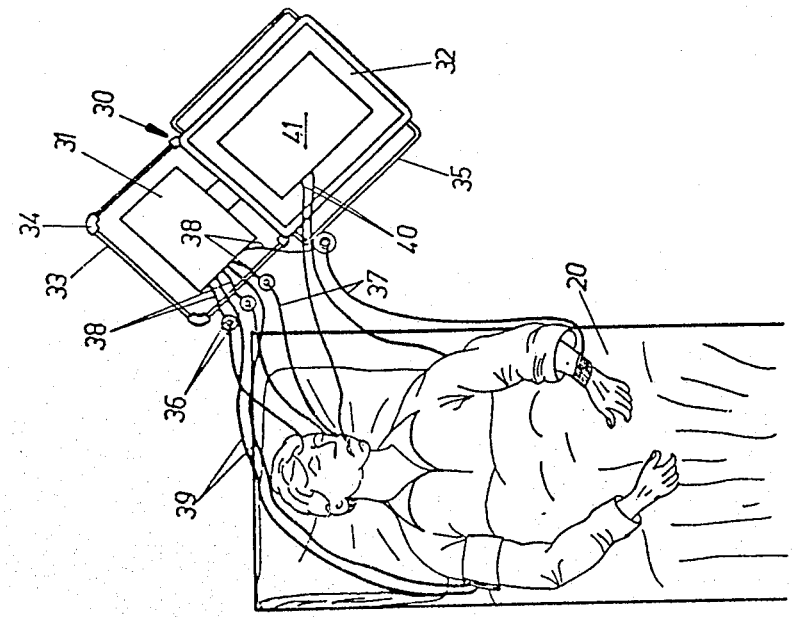
FIG. 1 is a top view of a first embodiment of the apparatus according to this invention.
Figure 1A:
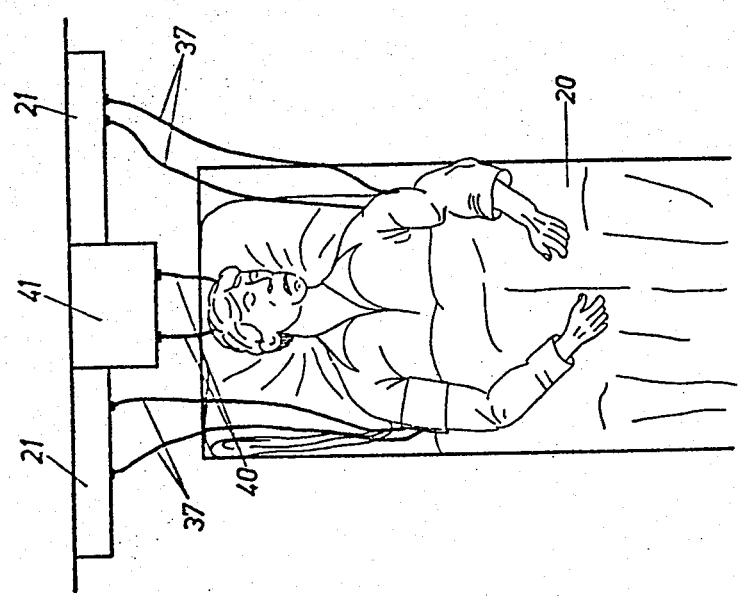
FIG. 1A is a top view like FIG. 1 of a prior-art such apparatus.

As seen in FIG. 1A it is standard practice to provide a service and supply stand at the head of a hospital bed 20, against the wall. To this end the device has a central monitor 41 connected via leads 40 to the patient and from which extend two horizontal connection arms 21 connected by respective leads 37 to the patient. Obviously such an arrangement completely blocks access to the bed 20 from the head thereof.

The system according to the instant invention, as seen in FIG. 1, has an upright column 31 that can be positioned at the corner of the bed and carrying an outrigger-style monitor 41 on a device support or housing 32. An annular support rail 33 provided at its corners with bumpers 34 surrounds the upright column, and similar such rails 35 are provided on the front and back of the housing 32. Equipment 36 hung from these rails 33 is connected via leads 38 to the column 31 and via leads 39 to the patient. This arrangement leaves access from all sides to the patient in the bed 20.

As seen in FIG. 2 such a column 31a can carry two such housings 32 with rails 35 on its opposite sides. The front wall of the column is formed by a plurality of different connection plates 46a-d, above which and below which are blank plates 51 that just close off the mainly hollow column 31a. Each side wall of the column 31a is formed by two outer caps 54 separated by strips 55 from a stack of center plates 53. The entire column 31a stands by means of a foot 52 on the floor 42 and extends up into the space 44 above the lowered-ceiling level 43 to the real ceiling 45 where it is rigidly fixed.

The plate 46a has a vacuum line or exhaust port 47. The plate 46b is provided with low-voltage electrical connections 48a and 48b for monitoring the patient's condition, connected to appropriate electrical lines 22 that extend up in the column 31a to the space 44 and thence to the appropriate feed or equipment. A simple outlet 49 is provided on the connection plate 46c, and the plate 46d has gas connections 50 connected to gas lines 23 extending like the lines 22 up in the column 31a to the space 44.

Such plates 46a-d can be mounted on the sides or back of the column 31a too, but normally are only provided on the front, with some little-used connections being put on the rear if there is insufficient space on the front.

Figure 5:
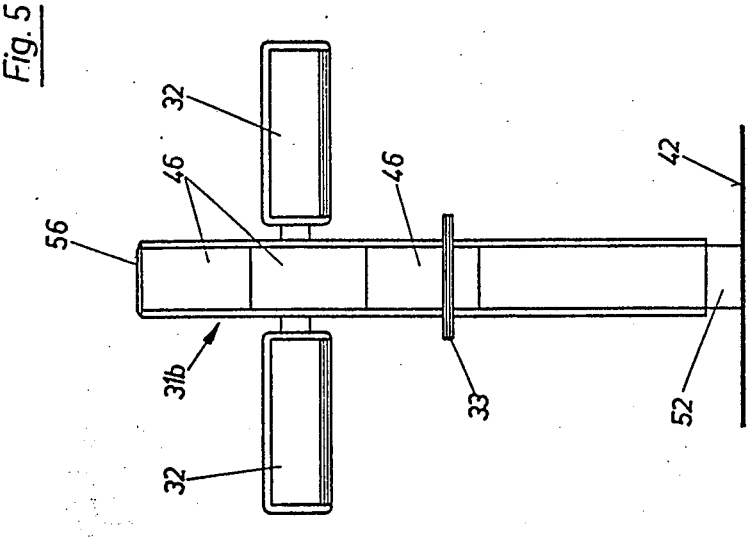
FIGS. 4-6 are front views of third, fourth, and fifth embodiments of the apparatus of this invention.
Figure 4:
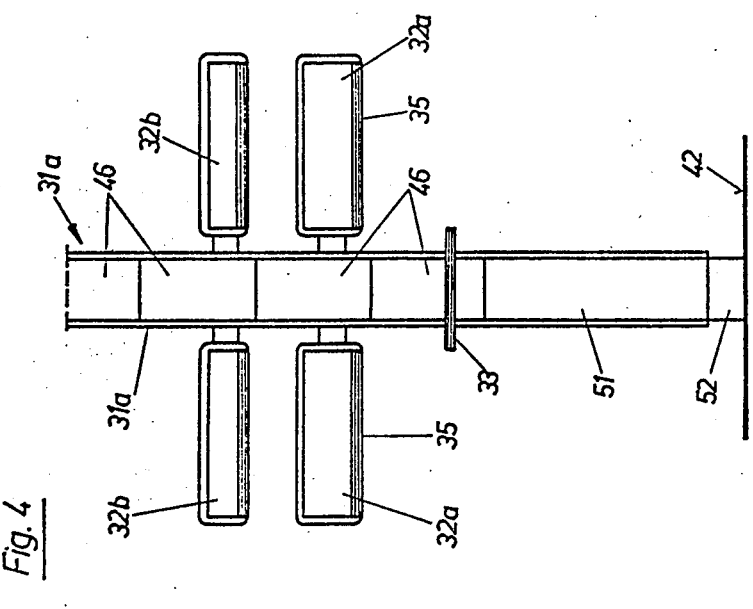

FIG. 4 shows an arrangement wherein blank plates 46 are provided, but two lower housings 32a are provided along with two upper housings 32b. Only the lower device housings 32a are provided with rails 35. In FIG. 5 a column 31b is shown which has a top cap 56 and which therefore is not connected to the ceiling.

Figure 6:
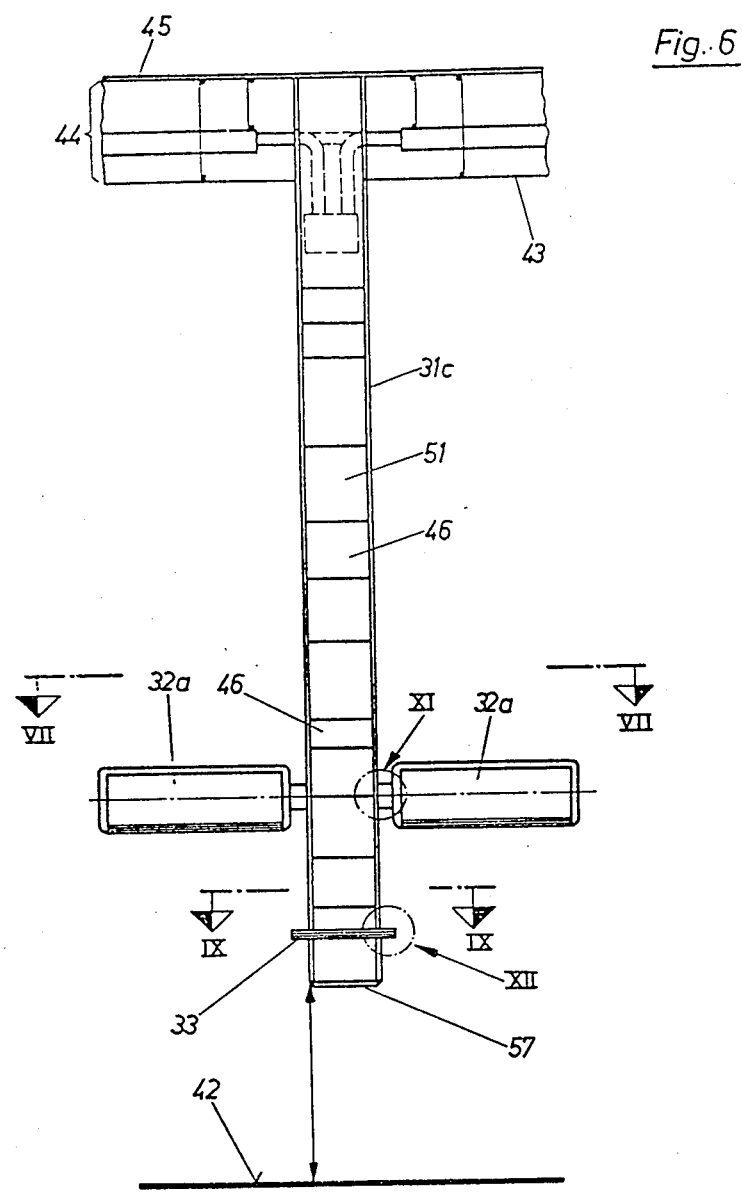
Figure 7:
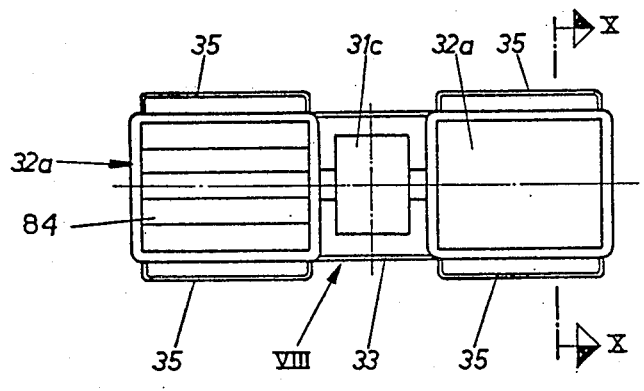
FIG. 7 is a section taken along line VII—VII of FIG. 6.
Figure 10:
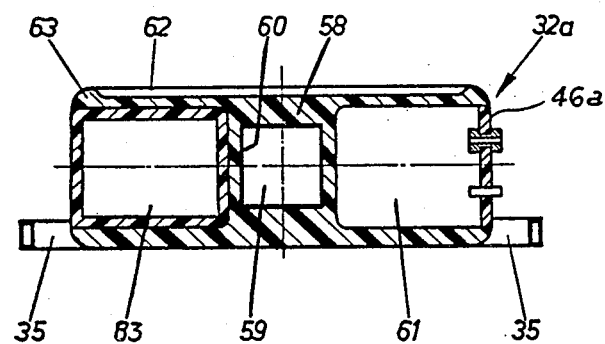
FIG. 10 is a section taken along line X—X of FIG. 7.

The column 31c of FIG. 6 depends from the ceiling and has a bottom cap 57, so that it hangs free of the floor. This arrangement once again carries two housings 32a. As seen in FIGS. 7 and 10 each of these housings 32a is made of a durable synthetic resin and is formed with a central passage 59 in which fits a square-section metal support beam 60. The housings 32a are formed with horizontally open pockets or recesses 61 that may receive drawers 83 or support plates 84, or that may be covered with further connection plates such as 46a. The top of the housing 32a is formed with a tray-like recess 62 having a rim 63. A device such as a cardiac monitor can therefore sit safely atop the housing 32a.

Figure 8:
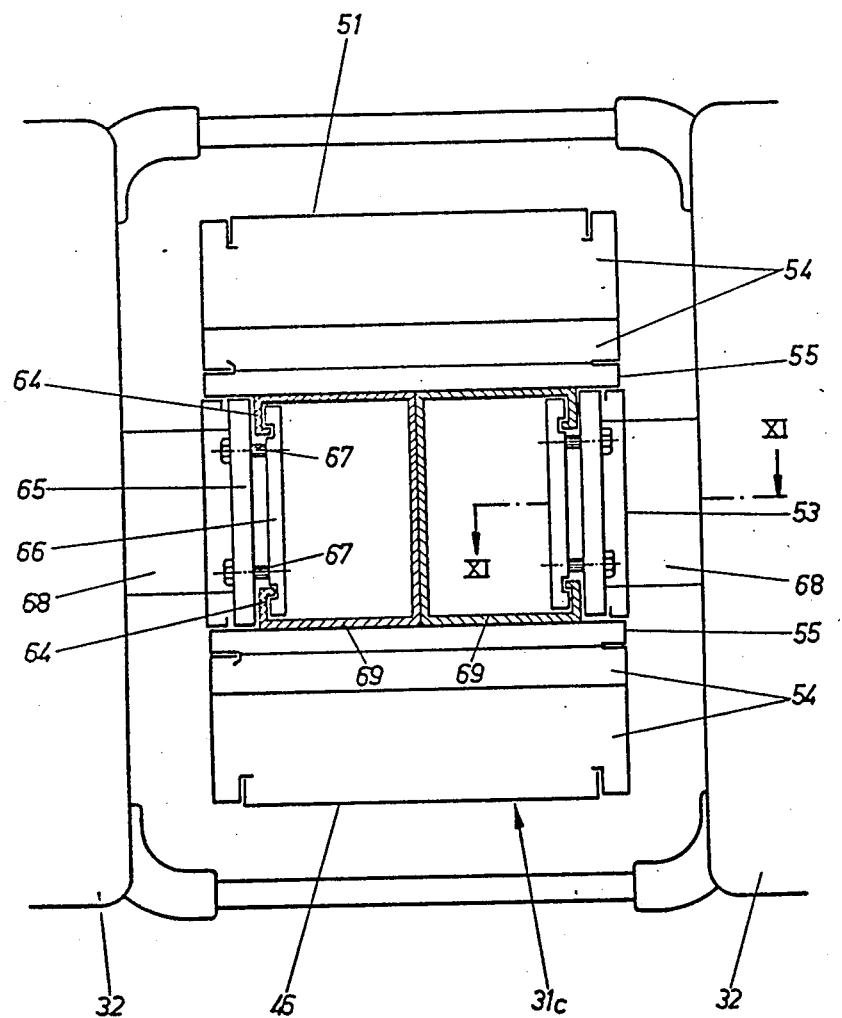
FIG. 8 is a large-scale section of the detail indicated at VIII in FIG. 7.
Figure 11:
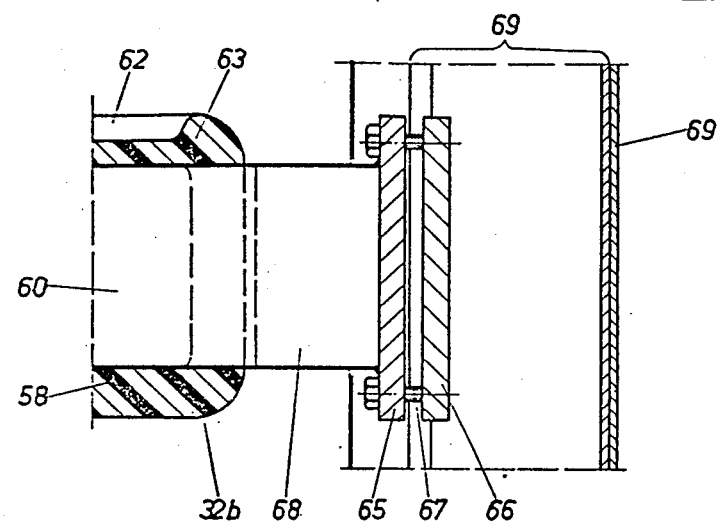
FIG. 11 is a section taken along line XI—XI of FIG. 8.

FIGS. 8 and 11 show how the column 31c is formed by two back-to-back C-section beams 69 having lips 64. The support beam 60 has an inner end 68 formed with a flange or foot 65 that sits flatly against the lip 64 and that is clamped thereagainst by bolts 67 tha extend through this flange 65 and into another plate 66 lying to the other side of these lips 64. As seen in FIG. 11 four such bolts are provided, so that the housing 32b is extremely solidly mounted.

Figure 9:
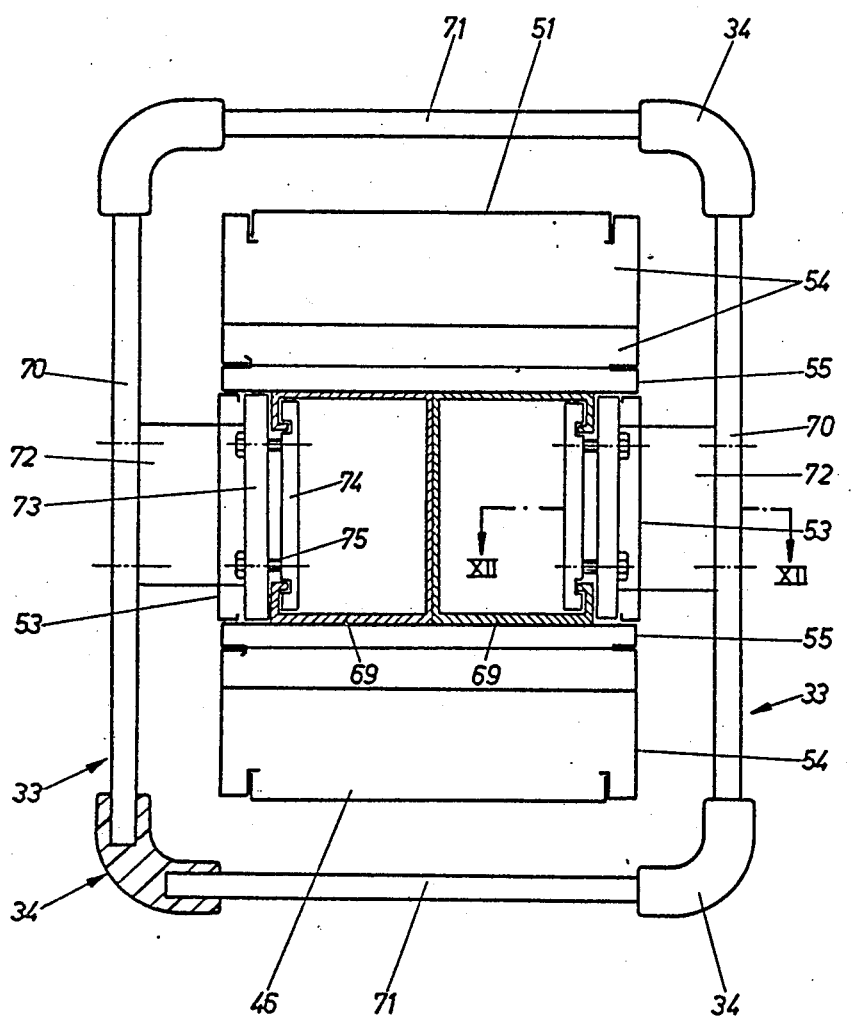
FIG. 9 is a section taken along line IX—IX of FIG. 6.
Figure 12:
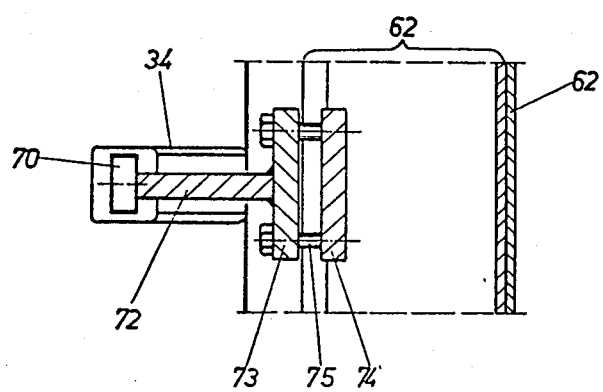
FIG. 12 is a section taken along line XII—XII of FIG. 9.

FIGS. 9 and 12 show how the rail 33 is formed by square-section stainless-steel rods 70 and 71 interconnected at the bumpers 34. The rods 70 are bolted or welded to feet or struts 72 formed with flanges 73 clamped by inner plates 74 and bolts 75 to the lips 64, just like the beam 68. In this manner the rail 33 is extremely rigid so it can safely support fairly heavy equipment. FIG. 9 further indicates how the elements 51, 53, 54, and 55 are of light sheet metal.

Figure 13:
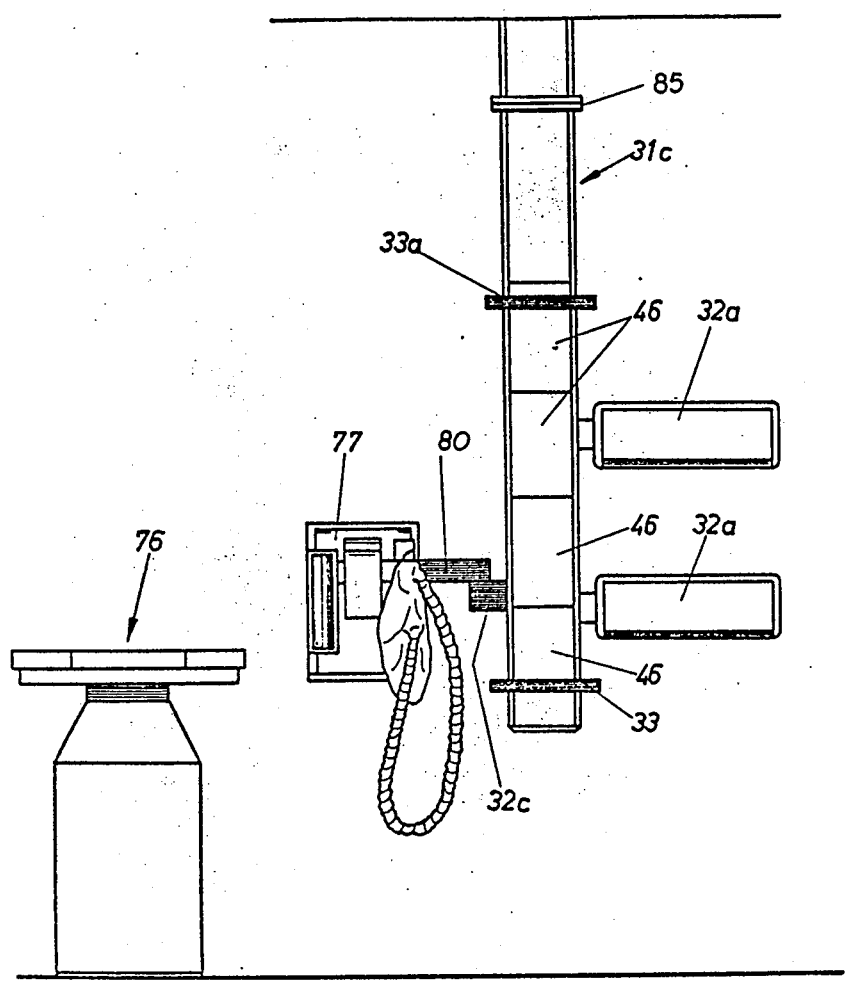
FIG. 13 is a front view of a sixth embodiment of the apparatus of this invention.

The column 31c of FIG. 13 is provided with a pivot 85 permitting its lower portion to pivot about an upright axis relative to its upper portion. In addition this arrangement has an upper annular support rail 33a and two housings 32a to one side. Another support 32c has an arm 80 carrying an anesthetizing apparatus 77 adjacent an operating table 76. Thus the equipment 77 can easily be swung into position.

Figure 14:
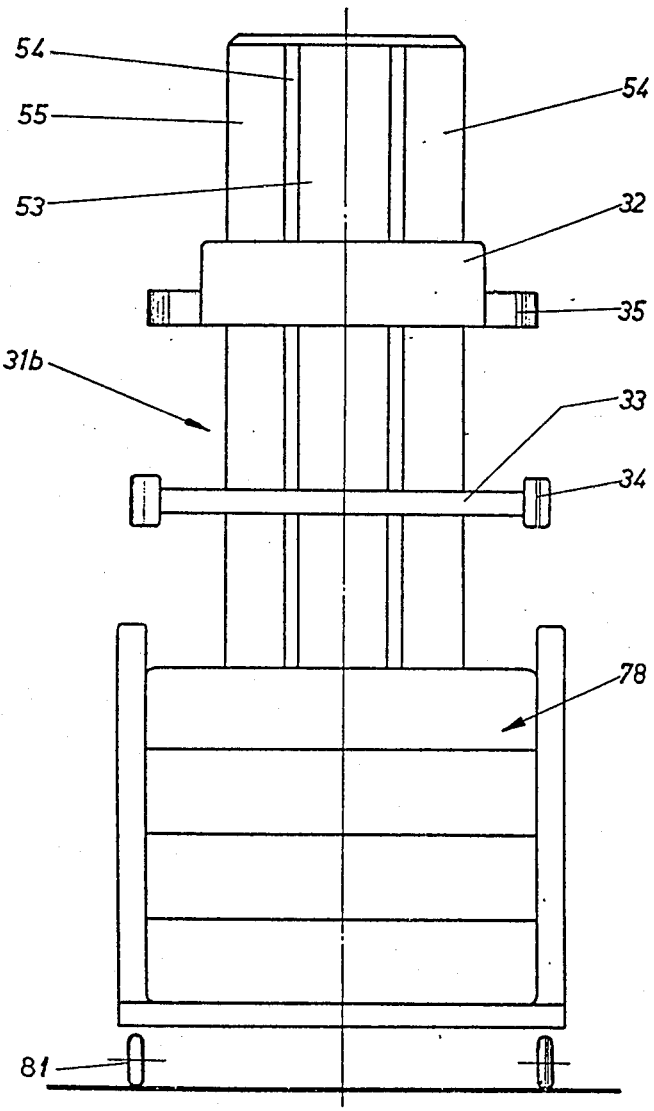

In FIGS. 14 and 15 the column 31b is mounted on a cart 78 having wheels 81 and provided internally with reservoirs and electrical connections 79. Such a system can therefore be rolled right to the job, and rolled away when not in use. It can incorporate a transmitter 86 for connection to a remote monitoring site. In addition one of the housings 32 can be secured by a swivel or pivot 82 to the column 31b for movement about a horizontal axis relative thereto.

The system according to the instant invention has several important advantages over the prior-art service and supply stands. The vertical and, if desired, pivotal arrangement of the column allows a great deal of connections to be made in a limited space. The floor space occupied by it is quite small, so that it can be placed next to a work area without appreciably blocking access to it from any direction. Being vertical, it has virtually no surfaces to collect dust and present a cleaning problem. Modular construction allows the arrangement to be adapted to virtually any application. All of the connections can be made from the front for ease of use.

I claim:

1. A service and supply stand comprising:
   an upright column having a front wall, a back wall, and a pair of opposite sides;
   a plurality of lines in said column for conduction of fluids and electricity;
   a plurality of connection supports forming a portion of said front wall and carrying respective groups of connections connected to said lines;
   a horizontal and annular support rail carried on and spacedly surrounding said column adjacent said connection supports and lying in a substantially horizontal plane;
   a device housing secured to one of said sides and projecting laterally from said column;
   another horizontal support rail carried on said device housing; and
   means for securing said housing and its support rail to said one side of said column at any of a plurality of vertically offset positions, whereby the vertical spacing between said rails and connections can be varied.

2. The service and supply stand defined in claim 1 wherein said supports are plates flush with said front side.

3. The service and supply stand defined in claim 2 wherein said column is of rectangular section.

4. The service and supply stand defined in claim 3 wherein said back wall and sides of said column are also adapted to carry such connection plates.

5. The service and supply stand defined in claim 3 wherein only said front and back wall are adapted to carry such connection plates and said sides only are adapted to carry said housing.

6. The service and supply stand defined in claim 3, further comprising a pivot securing said housing to said side for pivoting about a horizontal axis.

7. The service and supply stand defined in claim 3 wherein said housing is provided with a slide-out support plate.

8. The service and supply stand defined in claim 3 wherein said housing is provided with a slide-out drawer.

9. The service and supply stand defined in claim 3 wherein said housing is provided with one such connection plate.

10. The service and supply stand defined in claim 3 wherein said fluids include liquids and gases.

11. The service and supply stand defined in claim 10 wherein adjacent connections are for related functions.

12. The service and supply stand defined in claim 11 wherein the connections of each connection plate serve related functions.

13. The service and supply stand defined in claim 10 wherein the connections of one group serve unrelated functions.

14. The service and supply stand defined in claim 3, further comprising a pivot carrying said column for pivoting of same about a vertical axis.

15. The service and supply stand defined in claim 14 wherein said pivot subdivides said column vertically into two relatively pivotal parts.

16. The service and supply stand defined in claim 3 wherein said column stands on the floor.

17. The service and supply stand defined in claim 16 wherein said column has an upper end adapted to be secured to the ceiling above said column.

18. The service and supply stand defined in claim 3 wherein said column is adapted to be suspended from the ceiling.

19. The service and supply stand defined in claim 3 wherein said column is horizontally displaceable.

20. The service and supply stand defined in claim 3, further comprising a wheeled cart supporting said column.

21. The service and supply stand defined in claim 20 wherein said wheeled cart is provided with liquid and gas reservoirs connected to said lines.

22. The service and supply stand defined in claim 20 wherein said wheeled cart is provided with electrical interconnections connected to said lines.

23. The service and supply stand defined in claim 20 wherein said wheeled cart is provided with an electrical feed connected to one of said lines.

24. The service and supply stand defined in claim 20 wherein said wheeled cart is provided with a transmitter having an input connected to at least one of said lines.

25. The service and supply stand defined in claim 3 wherein said column is formed by a pair of back-to-back C-beams opening away from each other at said sides.

26. The service and supply stand defined in claim 26 wherein said C-beams have flanges provided with lips, the securing means clamping itself to said lips.

27. The service and supply stand defined in claim 26 wherein the first-mentioned support rail is provided with means for clamping itself to said lips.

28. The service and supply stand defined in claim 3 wherein said housing is formed with a least one horizontally open pocket.

* * * * *